Oct. 22, 1968   P. D. FAULK   3,406,479
GAME CALL
Filed Aug. 23, 1966

INVENTOR.
PAUL D. FAULK
BY
Cushman, Darby & Cushman
ATTORNEYS

United States Patent Office 3,406,479
Patented Oct. 22, 1968

3,406,479
GAME CALL
Paul D. Faulk, 616 18th St., Lake Charles, La. 70601
Filed Aug. 23, 1966, Ser. No. 574,408
6 Claims. (Cl. 46—180)

The present invention relates to game calls and more particularly to an improved variable tone game call which is less susceptible to choking.

Game calls, for instance such as are shown in my earlier U.S. Patent 2,730,836 have come into widespread usage among sportsmen as well as naturalists. In general, when air is blown through, or otherwise forced through, such calls past a reed which the air causes to vibrate, various fowl and other animal utterances can be imitated with such close approximation as to attract the attention of such fowl and other animals. Although variation in pressure and duration of the air stream blast through a particular call may effectively allow the same call to imitate different species of animals or different individuals of a species, for instance, does and bucks among white tailed deer. While it is necessary for wider latitude of sound imitation to have calls of varied size and construction, much variation of pitch may be provided on a single game call by controlling the effective length of the vibratable reed within the call. Recognizing this, others have provided various reed adjustment features, but heretofore no wholly satisfactory adjustable reed game call has come to the fore.

Such prior art calls as have metal, threadably rotatable or slidingly reciprocable slides to effect variation in effective reed length can prove difficult to operate under field conditions, for instance in a duck blind on a cold day. In addition, operation of such metal slides sometimes slits or otherwise damages the reed of the call.

A further drawback of prior art adjustable pitch game calls resides in the propensity of such calls to choke when blown hard, especially when the reed has been restrained over the major part of its length in order to achieve a high pitch.

Accordingly, it is an object of the present invention to provide an adjustable pitch game call which is easy to operate under even adverse field conditions which is durable, easy to operate and which is quite rugged.

A further object of the present invention is the provision of a game call of the type described which is very resistant to choking even when a major portion of the reed thereof is restricted and the call blown hard, whereby very high pitch, relatively high amplitude animal cries can be successfully imitated.

Yet another object of the present invention is the provision of a variable pitch game call wherein reed lies adjacent a trough member and both are circumferentially surrounded and resiliently engaged by a rollable ring of elastic material which can be easily slid along the trough and reed to vary the effective length of the reed, yet will stay where positioned until intentially moved.

A further object of the invention is the provision of a game call of the type described which provides for accomplishment of better tone control, is easily hand worked to provide for closer approximation of particular sounds, and which easily accommodates variation in reed raw material.

Another object of the present invention is the provision of a game call of the type described having a reed of plastic sheet material and which can be switched end-for-end upon splitting of one end region in order to allow continued use of the call.

These, as well as other, objects of the present invention, the principles and scope of applicability thereof will appear and become more vivid during the course of the following detailed discussion in which reference is made from time to time to the embodiment illustrated in the attached drawing.

Figure 1:
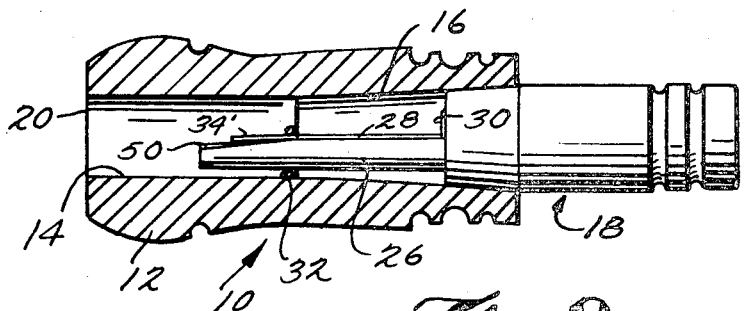
FIGURE 1 is a side elevation view of a game call according to the present invention, the mouth piece thereof being cut-away along a vertical, longitudinal center-line plane to expose details otherwise hidden when the device is in an assembled condition.
Figure 3:
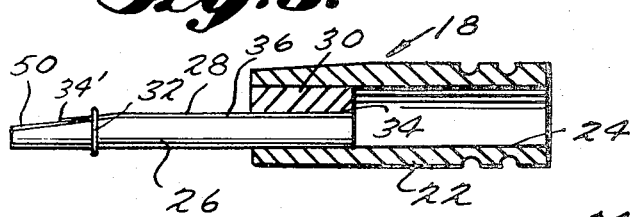
FIGURE 3 is a side elevation view of a game call according to the present invention, the mouth piece thereof having been removed and the tubular throat element cut-away along a vertical, longitudinal center-line plane to expose details otherwise hidden from view.
Figure 6:
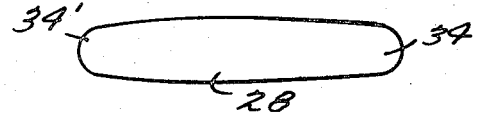
FIGURE 6 is a top plan view of the reed of the game call of FIGURES 1-3.

The game call 10 is shown comprising a generally tubular mouth piece 12 having a throughbore 14 that is frustoconically flared 16 near one end to removably receive and frictionally retain the assembly 18 shown by itself in FIGURE 3. When assembled as shown in FIGURE 1, the device 10 will emit a call imitation when air is blown into the throughbore 14 through the mouth piece 12 end 20. The assembly 18 includes a generally tubular throat element 22 having a longitudinal throughbore 24, a trough element 26, a flexible reed 28, a wedge 30, and a pitch adjuster 32.

In the embodiment illustrated, the throat element 22 is approximately semi-circular in transverse cross-section; the reed 28 is substantially flat and thin; and the wedge 30 is approximately semi-circular in transverse cross-section progressively increasing slightly in cross-sectional area from right to left as seen in FIGURE 3. The reed 28 is provided with a rounded tongue-like tip 34, 34' at each end.

To assemble the trough element, reed and wedge to the throat element, the former three elements are stacked as shown in FIGURE 3 and slid into the throat element bore until wedged in tightly by virtue of the increasing cross-sectional area of the wedge 30.

Should the reed tongue 34' split during use, the trough element, reed and wedge can be simply pulled out of the throat element bore, the reed 28 turned end-for-end and the trough element, reed and wedge reinserted in the throat element bore.

It should now be noticed that the trough element 26 upwardly facing surface 36, which is generally horizontal in the rearward region 38 thereof, progressively declines leftwardly as it proceeds leftwardly, as seen in FIGURES 1 and 3 to end at 40. Looking now at FIGURES 2, 4 and 5, the trough element 26 is seen to have an upwardly opening, longitudinally elongated through 42 in its upper surface, proceeding from the end 44 to a point somewhat short of the end 40. Throughout most of the length of the trough 42, the lowermost generatrix thereof is generally horizontal, however adjacent the terminus of the trough, in the region 46, the trough leftwardly decreases in depth, forming the lip 48 best seen in FIGURE 5 wherein it should also be noted that part of the trough is visible above the lip.

Figure 4:
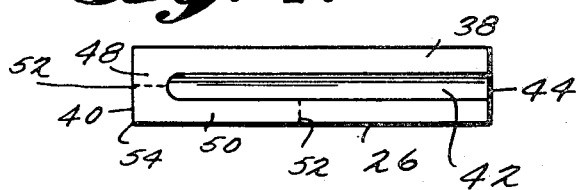
FIGURE 4 is a top plan view of the trough element of the game call of FIGURES 1-3.
Figure 5:
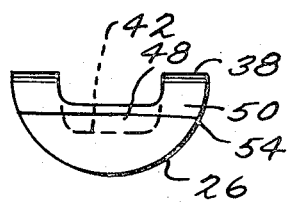
FIGURE 5 is an expanded scale, left end elevation view of the trough element of FIGURE 4.

With reference to FIGURES 4 and 5, the trough upper surface in the area 50 thereof roughly the quadrant thereof between the dotted lines 52, is not only tilted toward the end 40, but also toward the corner 54. Referring to FIGURE 5, and using conventional map directions, the surface 36 in the southeast quadrant thereof is slightly canted toward the south, southeast, for instance at about 1 to 10 degrees from the incline it would have were it symmetrical with the other side of the trough upper surface. The canted region 50 provides the novel anti-choking feature referred to hereinbefore.

Figure 2:
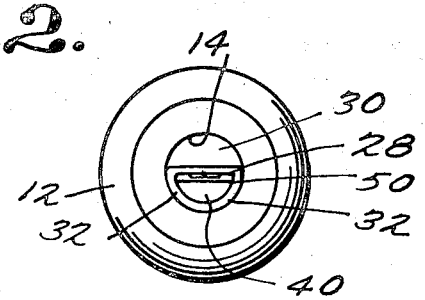
FIGURE 2 is a left end elevation view of the game call of FIGURE 1.

The reed 28 preferably comprises a piece of thermoplastic sheet material, .010 to .014 inch thick for instance of nylon, polyethylene, polypropylene, polyoxymethylene, polytetrafluorethylene, ABS, polyvinyl chloride-vinyylidene chloride copolymer, or the like, the same being durable yet easily cut and machined even with scissors and sand paper for the achievement of individualistic effects. When mounted as shown in FIGURES 1–3 the free end of the reed tends to stand above the inclined portion of the trough element upper surface.

The pitch adjuster 32 comprises a band or ring of rubbery or at least elastic, flexible material such as nylon, PTFE, neoprene or the like. In many instances a conventional O-ring or rubber band will serve well. The pitch adjuster 32 is of such short circumference that in order to be positioned as shown in FIGURES 1–3, it must be at least slightly elastically stretched. Accordingly, the pitch adjuster circumferentially, resiliently engages the trough element and reed, may be manually moved by any increment, large or small, to achieve variation of the pitch produced by blowing on the mouth piece. The effective vibrating length of the reed comprises that portion of the reed between its engagement by the pitch adjuster 32 and the free end of the reed. To change the pitch, the mouth piece 12 is removed from the assembly 18, the pitch adjuster moved the desired distance, and the mouth piece put back in place. The pitch adjuster by virtue of its resilient engagement, remains where positioned until manually moved by a repeat of the process just mentioned.

It has been found that the sound produced by the game wall 10 depends upon there being spacing between the upper surface of the trough element and the lower surface of the reed in the region coincident with the reed portion which is to vibrate. It has also been found that when the trough element is symmetrically sloped toward its free end, a strong air blast through the mouth piece, especially when the pitch adjuster has been moved forwardly as in FIGURE 3 to produce a higher pitch call imitation, the air blast merely forces the reed lower surface into firm, non-vibrating contact with the trough element. The call is then said to be "choked" since no sound, or at least no desired sound, issues from the game call.

Choking, according to the present invention, is avoided by formation of the forward and sideward canted surface region 50 which ensures that even though the reed is forced down against the remainder of the trough element inclined surface by a strong air blast, it will remain spaced from at least part of the region 50, since it would require an unreasonably strong air blast to also torsionally twist the reed into lying flat against the novel trough element upper surface.

Obviously "upward," "leftward," etc. are relative terms used herein in describing the device as oriented in the drawing. The device 10 should be understood as being operable no matter what position it is held in.

From the foregoing detailed discussion, it should now be apparent that the embodiment illustrated provides for accomplishment of each of the objects set forth at the beginning of this specification and clearly illustrates the principles of the present invention. Because the embodiment illustrated can be considerably modified and yet accomplish the objects of the invention without departing from these principles, the present invention should be understood as encompassing all such modifications as are within the spirit and scope of the following claims.

I claim:
1. A game call comprising: an elongated trough element having means defining a longitudinally elongated upwardly opening trough therein; a flexible reed overlying said trough, means securing said reed to said trough element in the region of one end of each, the opposite end region of each being a free end region; said trough element and said reed being so constructed and arranged that said reed free end region is spaced above said trough free end region; a generally tubular mouth piece peripherally enclosing said reed and said trough element in the free end region of each; and a resilient annular pitch adjuster received on said trough element and reed in resilient circumferential engagement therewith and being manually movable therealong to increase and decrease the pitch of the simulated call producible by blowing on said mouth piece.

2. The game call of claim 1 wherein the pitch adjuster comprises a rollable O-ring.

3. The game call of claim 1 wherein the flexible reed comprises a piece of thermoplastic sheet material.

4. The game call of claim 3 wherein the reed is longitudinally symmetrical, being rounded at each end thereof, whereby said reed is reversible.

5. The game call of claim 1 wherein the securing means comprises a tubular throat element in the bore of which said trough element and flexible reed one end regions are received, and a wedge frictionally received in said throat element comprising a continuation of said horizontal upper surface and sloping downwardly toward said trough element opposite end.

6. The game call of claim 5 wherein said sloping upper surface is unsymmetrical with respect to the longitudinal axis of said trough element, said sloping surface on one side of said longitudinal axis sloping downward laterally outwardly as well as downwardly toward said trough element opposite end, to thereby prevent choking of said game call, to retain the trough element and flexible reed one end regions affixed thereto; said trough proceeding through said trough element one end region and communicating with the bore of said throat element; said trough terminating short of the opposite end of said trough element; said trough element in said one end region having means defining a generally horizontal upper surface; and said trough element in said trough element opposite end region having means defining a sloping upper surface.

References Cited
UNITED STATES PATENTS

| | | | |
|---|---|---|---|
| 827,819 | 8/1906 | Reynolds | 46—180 |
| 2,072,786 | 3/1937 | Yager | 46—180 |

LOUIS G. MANCENE, *Primary Examiner.*

R. F. CUTTING, *Assistant Examiner.*